United States Patent Office 2,889,217
Patented June 2, 1959

2,889,217

PROCESS FOR PRODUCING DEFLUORINATED PHOSPHATE MATERIAL

Ira Milton Le Baron, Evanston, Ill., assignor to International Minerals & Chemical Corporation, a corporation of New York No Drawing. Application April 12, 1954
Serial No. 422,659

6 Claims. (Cl. 71—47)

This invention relates to a process for producing phosphate material for use as animal food supplement although it does not preclude its use as fertilizers or plant foods. More particularly, it relates to a novel process for the production of high grade defluorinated phosphatic products.

Various grades of superphosphates are produced in commerce. The fluorine content of these superphosphates preclude their use as animal food supplement material. Further, the superphosphates show very low availability to an animal of the elemental phosphorus content therein. As used herein in reference to phosphate feed materials, availability means the extent with which phosphates are metabolized by animals as revealed by a biological measurement such as bone calcification and the like.

In an attempt to prepare phosphate materials of low fluorine content the phosphate industry among other processes has prepared defluorinated products by extracting the water soluble constituents from superphosphates, treating the extract solution to remove fluorine and then precipitating mixtures of the various calcium phosphates.

In this latter process the chemical reaction for precipitation of phosphates from a predominantly monocalcium phosphate extract solution is generally expressed as

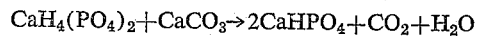

$$CaH_4(PO_4)_2 + CaCO_3 \rightarrow 2CaHPO_4 + CO_2 + H_2O$$

Prior to such precipitation step a small quantity of calcium carbonate is reacted with the predominantly monocalcium phosphate solution to produce a pH of the order of 2.5 to approximately 3.0 in order to precipitate fluorine, silicofluorides and aluminum and iron phosphates. This preliminary calcium carbonate treatment presents a serious control problem if the quantity of $P_2O_5$ lost as a part of this precipitate is to be held to a minimum. In most plant operations the losses are appreciable. In order to avoid large losses of $P_2O_5$ in this cake material, such cake materials have heretofore been mixed with impure phosphoric acid and/or impure monocalcium phosphate solutions such as are produced by the leaching of aged or unaged superphosphate. The resultant mixture is then dried to produce a fertilizer material which is predominantly a mixture of the various calcium phosphates. While avoiding losses, this product places in the channels of commerce an appreciable proportion of $P_2O_5$ at a price appreciably lower than is obtainable for the primary product of this process, dicalcium phosphate.

It is a primary object of this invention, therefore, to overcome the disadvantages and shortcomings of the above process.

It is still another object of this invention to provide a method which converts a waste product into a useful animal feed supplement material.

It is still another object of this invention to provide a process wherein all of the phosphate leached from superphosphate is converted into animal feed supplement material.

It is a further object of this invention to provide a new animal feed supplement material from heat treated mixtures of defluorination cake and predominantly phosphoric acid solution which is low in fluorine content.

It is still a further object of this invention to provide a process wherein reaction mixtures of defluorination cake and predominantly phosphoric acid solution are defluorinated and the phosphorus pentoxide content of the product restored to the available orthophosphate form in the final product.

These and other objects of the invention will become apparent from the following description.

Now it has been discovered that phosphatic material which is high in fluorine and high in lime can be treated with acidic phosphatic solutions, and the fluorine content thereof readily volatilized at relatively low temperatures by drying and calcining; and that the phosphate content of the product may be readily converted back to the ortho form with a simple treatment with steam. To give a specific illustration, when impurities are precipitated from acidic phosphate solutions with calcium-bearing precipitants, the high calcium, high fluorine content solids can be mixed with acidic phosphatic solution, such as impure phosphoric acid or impure solutions obtained by leaching superphosphates, to lower the $CaO/P_2O_5$ mol ratio and to produce a mixture from which the fluorine content is readily volatilized at relatively low temperatures and which may be readily restored to the orthophosphate state by autoclave treatment in the presence of steam.

Accordingly, in the instant process, extract solution from the leaching of superphosphates which would give a leach solution having a CaO to $P_2O_5$ mol ratio of less than about 1.05 on an impurity corrected basis, although the $CaO/P_2O_5$ ratio may be higher if sufficient impurities are present to tie up sufficient CaO to provide a resulting corrected ratio of less than 1.05, is treated with an alkaline earth metal oxide, hydroxide, carbonate and the like such as lime or calcium carbonate to defluorinate the extract which after removal of precipitated solids is then subjected to the dicalcium phosphate precipitation reaction. The precipitation solids which contain fluorides, iron and aluminum phosphates and miscellaneous phosphates are mixed with an undefluorinated extract solution in proportions to give a $CaO/P_2O_5$ ratio in the range of approximately 0.6 to about 1.2, and the resultant slurry reduced to dryness. This dry product is then heat treated at a temperature in the range of about 325° C. to about 500° C., and the heat treated product subjected to hydrolysis by heating to a temperature in the range of approximately 110° C. to 200° C. while in the presence of an aqueous medium such as an atmosphere of steam.

The crude mixture of fluorine, silicofluoride and the like, i.e. the defluorination cake, as produced in the instant process is prepared as follows: Phosphate rock is admixed with sulfuric acid to form an acid mix. The phosphatic source material is best utilized if it is finely ground, i.e., about 40% to about 80% capable of passing through a 200 mesh standard screen. Less finely ground material may be used but subsequent acidulation requires considerably less time to achieve substantial as well as complete conversion. Generally the finely ground material is allowed to react with sulfuric acid under constant and intensive agitation which is of short duration.

The time of mixing is preferably of the order of 1 minute to 2 minutes, which time is sufficient for thorough mixing and at the same time results in the formation of a porous easily crushed mass of low bulk density. The temperature of the acid fed to the mixer is generally within the range of about 65° C. to about 100° C.

The sulfuric acid mixed with finely ground rock may be of any convenient dilution, for example, about 50% to about 70% sulfuric acid corresponding to about 40° Bé. to about 55° Bé. It will, of course, be understood that under such conditions concentrations of sulfuric acid higher than mentioned can be utilized.

Acid is added to the ground phosphate rock in such proportions that there will be present in the mix between about 101% and about 115% of the sulfuric acid theoretically required to convert all the $P_2O_5$ present in the rock to monocalcium phosphate, allowing in addition enough acid to also react with the impurities such as iron, aluminum, fluorine and the like. The total quantity of acid need not be added all at the same time, but may be partially added originally and the remainder added during or before the subsequent leaching step.

Acid mix sets up in about 15 minutes to about 20 minutes into a dry mass which remains friable for indefinite periods of time. This acid mix, as initially formed, usually constitutes about 65% solids, but may range between about 45% and about 70% solids. The solidified mix may be conveyed directly to succeeding processing steps or it is simply stored until such time as required.

The acid mix is next subjected to a leaching and then a filtration operation. Acid mix brought from storage is usually passed through suitable pulverizing apparatus and the powdered product fed to a mixing tank in predetermined quantities where it is mixed with metered quantities of either water or dilute monocalcium phosphate aqueous solution. The leaching operation may be carried out at a temperature in the range of about 72° C. to about 82° C. in order to reduce the viscosity of the solution and improve filtration, provided the mol ratio of $CaO/P_2O_5$ is below 0.7, to prevent formation of insoluble dicalcium phosphate precipitates.

Leaching operations are preferably carried out by countercurrent flow of liquids and solids. Sufficient liquid leaching medium is added so that the resulting slurry contains between about 35% and about 40% solids, although more concentrated or more dilute slurries may be employed if desired. The agitation and slurrying is for a short period of the order of about 5 minutes to about 15 minutes.

In the countercurrent operation, water or dilute monocalcium phosphate solution first contacts solids which have passed through successive mixing stages and separations to the last mixing stage. After contact with water or the dilute monocalcium phosphate solution, the undissolved solids are separated and the separated material conveyed to waste or to storage. Rich liquor from the first filter stage contains approximately 20% to approximately 35% dissolved solids, of which approximately 18% to approximately 24% is phosphate measured as $P_2O_5$ values. The separation of phosphatic solution and insoluble solids may be carried out in any convenient and conventional manner, such as, for example, by filtration, countercurrent multiple stage centrifuging, or by use of liquid phase cyclone separators.

Phosphate solution recovered from the extraction step is an aqueous solution of approximately 20% to approximately 35% by weight solids content. The phosphate solution comprises essentially monocalcium phosphate and orthophosphoric acid.

Extract solution is diluted to between about 10% and about 15% $P_2O_5$ and the diluted solution reacted with sufficient calcium carbonate; i.e., generally about 5 pounds to about 8 pounds of calcium carbonate per 100 pounds of solution, to precipitate iron and aluminum phosphates and calcium fluorides. After removal of the precipitated solids, the resultant solution in general will analyze 11% to 14% $P_2O_5$, 0.10% to 0.20% sulfate ($SO_4$), 0.02% to 0.04% fluorine, 3.0% to 4.5% CaO, 0.02% to 0.04% each of $Al_2O_3$ and $Fe_2O_3$.

According to the instant invention, the defluorination cake which on a dry basis analyzes

| | Percent |
|---|---|
| $P_2O_5$ | 35–45 |
| Fluorine | 3–6 |
| CaO | 30–40 | is mixed with, for example, so-called green extract, i.e., a solution prepared by leaching unaged superphosphate. This solution is obtained by mixing finely ground phosphate rock with sulfuric acid in such proportions that upon leaching with water as the starting material a final acidic phosphorus-bearing solution will be obtained having a $CaO/P_2O_5$ mol ratio of less than 0.4 and preferably in the range of about 0.20 to about 0.40.

Conditions of mixing and leaching other than the use of larger quantities of sulfuric acid may be identical with those utilized in the stages preparatory to the precipitation of the calcium fluoride-bearing solids.

Precipitated solids and predominantly phosphoric acid solution are proportioned in a slurry so that the dry solid product will have a $CaO/P_2O_5$ mol ratio preferably in the range of about 0.75 to about 1.05. The slurry mixture is agitated in any conventional type mixing apparatus for a period of about 5 minutes to about 30 minutes in order to obtain reaction between the precipitation cake solids and the phosphoric acid solution. Reacted slurry mixtures are dried in conventional drying equipment as in a rotary kiln or Roto-louvre drier. Material is dried at temperatures in the range of about 110° C. to about 200° C. The dried solids are then heat treated at a temperature in the range of about 325° C. to about 800° C. for a period of about 90 minutes to about 45 minutes, respectively.

It will, of course, be understood that instead of carrying out the above drying and heat treatment in two stages, that such an operation can be carried out in a single stage if desired.

This drying treatment should be sufficient to remove 75% to 90% of the total water present. The calcining stage should liberate approximately 80% to 98% of the fluorine or other objectionable halogens to cause them to be carried off in gaseous form. This heat treatment step may be carried out at temperatures ranging from about 325° C. to about 800° C., with higher temperature treatments being utilized for processing of materials of higher $CaO/P_2O_5$ mol ratios. Some of the fluorine content of materials of lower $CaO/P_2O_5$ mol ratio is driven off in the drying step of a two stage heat treatment operation; but for quantitative removal of fluorine, heat treatment in the range of about 400° C. to about 650° C. is preferred.

The product remaining after the heat treatment is a substantially dry mixture of calcium phosphates having a fluorine content of less than 0.2% and a ratio of phosphorus to fluorine greater than about 150.

Conversion of the heat treated product back to the ortho form is accomplished by subjecting comminuted heat treated material to an atmosphere of steam maintained at about 5 pounds to about 50 pounds per square inch gauge pressure or above for a period ranging from about 1 minute to about 10 minutes. Preferably the heat treated material is reacted in an autoclave in which is maintained an atmosphere of steam at about 12 to about 20 pounds per square inch gauge pressure for about 30 minutes. The conversion will be more clearly understood from a study of the following example which is given by way of illustration and without any intention of having the invention limited thereto.

*Example*

About 10 tons per hour of Florida phosphate rock was ground to a particle size approximately 52% of which passed through a 200 mesh standard screen. This rock analyzed about 68% bone phosphate of lime. The ground rock was mixed with about 6 tons per hour of about 98% sulfuric acid added as approximately 53° Bé. aqueous solution. The mixture was thoroughly agitated for about one minute, after which it was discharged onto a continuous belt provided with exhaust means for gases, such as sulfur dioxide, silicon tetrafluoride and the like, adjacent to the point of discharge of slurry on the belt. The belt length and its speed were such that the mix remained on the belt approximately 20 minutes. The discharge from the belt was stored in a pile for about 30 days.

The stored material was then removed from storage, broken up, and sufficient water added to give a slurry of about 35% undissolved solids. The slurry was subjected to four stages of continuous countercurrent leaching and filtering, the final filtrate being a leached solution containing about 30% dissolved solids and being of approximately 27° Bé. gravity.

The filtrate from the leaching operation was further processed by adding approximately 1400 pounds per hour of calcium oxide or its equivalent in calcium hydroxide added in the form of hydrated lime, calcium carbonate, or other suitable calcium oxide source material. After slurrying for approximately 20 minutes, the slurry was filtered on a drum filter to remove precipitated materials such as calcium fluoride, aluminum phosphate, iron phosphate and the like. The filtrate from the slurrying or defluorination step was then treated with additional calcium carbonate to precipitate dicalcium phosphate of a purity useful as an animal feed supplement material.

This defluorination cake in dry form analyzed as follows:

| | Percent |
|---|---|
| $P_2O_5$ | 40 |
| CaO | 30 |
| F | 5 |

To an additional 10 tons per hour of Florida phosphate rock ground as in the preparation described heretofore was added about 6 tons per hour of about 98% sulfuric acid added as approximately 53° Bé. aqueous solution. The mixture was thoroughly agitated for about one minute, after which it has discharged onto a continuous belt provided with exhaust means for gases as explained heretofore. The belt length and its speed were adjusted such that the mix remained on the belt approximately 20 minutes. The material on the belt was discharged onto a mixer into which was added sufficient water to give a slurry of about 35% undissolved solids. The slurry was subjected to four stages of continuous countercurrent leaching and filtering. This final or No. 2 filtrate contained about 30% dissolved solids and being of approximately 27° Bé. analyzed as follows:

| | Percent |
|---|---|
| $P_2O_5$ | 18 |
| CaO | 1.9 |
| $Fe_2O_3$ | 0.7 |
| $Al_2O_3$ | 0.4 |

To this No. 2 filtrate was added the filter cake obtained as a precipitate in the step of defluorinating the filtrate prepared from aged superphosphate above. This mixture was dried in the Roto-louvre drier at the rate of approximately 5 tons per hour of dry solids. The solids analyzed as follows:

| $P_2O_5$ | percent | 52.6 |
|---|---|---|
| CaO | do | 19 |
| Fluorine | do | 2.7 |
| P/F | weight ratio | 8.5:1 |
| $CaO/P_2O_5$ | mol ratio | 0.92 |

Temperatures maintained in the Roto-louvre drier gave a solids discharge temperature of approximately 250° F. The dry material issuing from the Roto-louvre drier was calcined at a temperature of approximately 600° C. under conditions to give a one hour holding time. The heat treated product analyzed:

| $P_2O_5$ | percent | 64.5 |
|---|---|---|
| Flourine | do | 0.179 |
| P/F | weight ratio | 157.1:1 |

The calcined and comminuted product was treated batchwise in an autoclave where the material was held for 30 minutes in an atmosphere of steam maintained at 15 p.s.i. The hydrolyzed product analyzed:

| Total $P_2O_5$ | percent | 55.1 |
|---|---|---|
| Fluorine | do | 0.13 |
| P/F | weight ratio | 180:1 |
| Total $P_2O_5$ in Ortho Form | percent | 93.7 |

Having thus described my invention, what I claim is:

1. A method of producing defluorinated phosphatic material which comprises precipitating the fluorine impurities from fluorine-containing acidic phosphorus-bearing solutions with calcium carbonate, separately recovering a solution and fluorine-containing precipitated solids, preparing an impure fluorine-containing acidic phosphorus-bearing solution of $CaO/P_2O_5$ mol ratio of less than about 0.4, admixing the solution of $CaO/P_2O_5$ mol ratio of less than about 0.4 and the aforementioned fluorine-containing precipitated solids to produce a mixture having a $CaO/P_2O_5$ mole ratio of between about 0.6 and about 1.2, drying and calcining said mixture at a temperature of at least about 325° C. to remove moisture and to evolve fluorine, and hydrolyzing the heat treated product in the presence of steam to reconvert the $P_2O_5$ content to the orthophosphate form.

2. A method of producing defluorinated phosphatic material which comprises precipitating the fluorine impurities from fluorine-containing acidic phosphorus-bearing solutions with a reactant selected from the group consisting of calcium oxide, calcium hydroxide and calcium carbonate, separately recovering a solution and fluorine-containing precipitated solids, preparing an impure fluorine-containing acidic phosphorus-bearing solution of $CaO/P_2O_5$ mol ratio of less than about 0.4, admixing the solution of $CaO/P_2O_5$ mol ratio of less than about 0.4 and the aforementioned precipitated solids to produce a mixture having a $CaO/P_2O_5$ mol ratio in the range of about 0.6 to about 1.2, drying and calcining said mixture at a temperature of between about 325° C. and about 800° C. to remove moisture and evolve fluorine, and hydrolyzing the heat treated product in the presence of steam to reconvert the $P_2O_5$ content to the orthophosphate form.

3. A method of producing defluorinated phosphatic material which comprises precipitating the fluorine impurities from fluorine-containing acidic phosphorus-bearing solutions with a reactant selected from the group consisting of calcium oxide, calcium hydroxide and calcium carbonate, separately recovering a solution and fluorine-containing precipitated solids, preparing an impure fluorine-containing acidic phosphorus-bearing solution of $CaO/P_2O_5$ mol ratio of less than about 0.4, admixing the solution of $CaO/P_2O_5$ mol ratio of less than about 0.4 and the aforementioned precipitated solids to produce a mixture having a $CaO/P_2O_5$ mole ratio in the range of about 0.6 to about 1.2, calcining said mixture to remove moisture and evolve fluorine at a temperature in the range of about 500° C. to about 600° C. and hydrolyzing the heat treated product in the presence of steam to reconvert the $P_2O_5$ content to the orthophosphate form.

4. A method of producing defluorinated phosphatic material which comprises precipitating the fluorine impurities from fluorine-containing acidic phosphorus-bearing solutions with a reactant selected from the group consisting of calcium oxide, calcium hydroxide and calcium carbonate, separately recovering a solution and fluorine-containing precipitated solids, preparing an impure fluorine-containing acidic phosphorus-bearing solution of $CaO/P_2O_5$ mol ratio of less than about 0.4, admixing the solution of $CaO/P_2O_5$ mol ratio of less than about 0.4 and the aforementioned precipitated solids to produce a mixture having a $CaO/P_2O_5$ mol ratio in the range of about 0.6 to about 1.2, drying and calcining said mixture at a temperature of between about 325° C. and about 800° C. to remove moisture and evolve fluorine, and hydrolyzing the heat treated product in the presence of steam at a pressure of about 5 pounds to about 50 pounds per square inch absolute to reconvert the $P_2O_5$ content to the orthophosphate form.

5. A method of producing defluorinated phosphatic material which comprises mixing Florida phosphate rock with sulfuric acid to produce superphosphate, aging the acid rock mix, leaching the superphosphate with an aqueous solution to produce a final clear filtrate with about 30% dissolved solids and approximately 32° Bé. gravity, precipitating the fluorine impurities from said solution with calcium carbonate, separately mixing Florida phosphate ground rock with sufficient sulfuric acid to produce a predominantly phosphoric acid solution upon reaction and leaching of the mixture with aqueous medium, removing solids from the predominantly phosphoric acid solution, adding to the solids-free predominantly phosphoric acid solution the precipitated fluorine-containing solids from treatment of aged superphosphate in sufficient amount to produce a mixture having a $CaO/P_2O_5$ mole ratio of about 0.9, drying the mixture at a temperature of approximately 450° F., calcining the dry mixture in a rotary kiln at a temperature of approximately 600° C. for about one hour, and treating the calcined product with steam for about 30 minutes in an atmosphere of steam maintained at approximately 15 pounds per square inch absolute pressure.

6. A method of producing defluorinated phosphatic material which comprises precipitating the fluorine impurities from fluorine-containing acidic phosphate-bearing solutions by adding a reactant selected from the group consisting of calcium oxide, calcium hydroxide and calcium carbonate, separately recovering a solution and the fluorine-containing precipitated solids, preparing an impure fluorine-containing acidic phosphorus-bearing solution of a $CaO/P_2O_5$ mol ratio of less than about 0.4:1, admixing the latter solution and the aforementioned precipitated solids to form a mixture having a $CaO/P_2O_5$ mol ratio of between about 0.6:1 and about 1.2:1, drying and calcining said mixture at a temperature of at least about 325° C. to remove moisture and evolve fluorine, and hydrolyzing the heat treated product in the presence of steam to reconvert the $P_2O_5$ content to orthophosphate form.

References Cited in the file of this patent

UNITED STATES PATENTS

| 2,013,970 | Moore | Sept. 10, 1935 |
| 2,057,956 | Kaselitz | Oct. 20, 1936 |
| 2,115,150 | Seyfried | Apr. 26, 1938 |
| 2,360,197 | Butt | Oct. 10, 1944 |
| 2,567,227 | Miller | Sept. 11, 1951 |
| 2,722,472 | Le Baron | Nov. 1, 1955 |
| 2,728,635 | Miller | Dec. 27, 1955 |

FOREIGN PATENTS

| 637,578 | Great Britain | May 24, 1950 |